(12) United States Patent
Jonas et al.

(10) Patent No.: US 9,935,438 B2
(45) Date of Patent: Apr. 3, 2018

(54) DOOR CHIME ASSEMBLY

(71) Applicant: Broan-NuTone LLC., Hartford, WI (US)

(72) Inventors: Kenneth John Jonas, Mequon, WI (US); Daniel L Karst, Beaver Dam, WI (US)

(73) Assignee: Broan-NuTone, LLC, Hartford, WI (US)

( * ) Notice: Subject to any disclaimer, the term of this patent is extended or adjusted under 35 U.S.C. 154(b) by 0 days.

(21) Appl. No.: 15/584,683

(22) Filed: May 2, 2017

(65) Prior Publication Data

US 2017/0237247 A1 Aug. 17, 2017

Related U.S. Application Data

(63) Continuation of application No. 14/825,708, filed on Aug. 13, 2015, now abandoned.

(60) Provisional application No. 62/037,985, filed on Aug. 15, 2014.

(51) Int. Cl.
| | |
|---|---|
| *H02G 3/08* | (2006.01) |
| *H02G 3/12* | (2006.01) |
| *H02G 15/06* | (2006.01) |
| *H01F 27/06* | (2006.01) |
| *G10K 1/26* | (2006.01) |

(52) U.S. Cl.
CPC .............. *H02G 3/12* (2013.01); *G10K 1/26* (2013.01); *H01F 27/06* (2013.01); *H02G 15/06* (2013.01)

(58) Field of Classification Search
CPC ............ H02G 3/08; H02G 3/081; H02G 3/10; H02G 3/12; H02G 3/121; H02G 3/123; H02G 3/126; H02G 3/18; H05K 5/00; H05K 5/02; H05K 5/0204; H01R 13/46; H01F 27/06; G10K 1/26
USPC ......... 174/50, 53, 57, 58, 480, 481, 520, 54; 220/3.2–3.9, 4.02; 248/906
See application file for complete search history.

(56) References Cited

U.S. PATENT DOCUMENTS

| | | | | |
|---|---|---|---|---|
| 5,574,256 A | * | 11/1996 | Cottone | ............. H01R 13/6395 174/53 |
| 5,596,174 A | | 1/1997 | Sapienza | |
| 5,600,093 A | | 2/1997 | Herth et al. | |
| 5,603,424 A | | 2/1997 | Bordwell et al. | |
| 6,194,657 B1 | * | 2/2001 | Gretz | ..................... H02G 3/123 174/53 |
| 6,207,895 B1 | * | 3/2001 | Engel | ..................... H02G 3/121 174/53 |

(Continued)

OTHER PUBLICATIONS

"U.S. Appl. No. 14/825,708: Non-Final Office Action dated Sep. 23, 2016".

(Continued)

*Primary Examiner* — Angel R Estrada
(74) *Attorney, Agent, or Firm* — McDermott Will & Emery LLP

(57) ABSTRACT

A door chime assembly with a transformer assembly mounted within an electrical box and proximately to a chime. The transformer assembly including a transformer operably coupled to a bracket. The transformer being insertable into the electrical box such that the bracket and electrical box cooperate to electrically isolate the transformer from the chime. The electrical box having mounting features for securing the door chime assembly in existing and/or new construction.

11 Claims, 15 Drawing Sheets

(56) References Cited

U.S. PATENT DOCUMENTS

| | | | |
|---|---|---|---|
| 6,520,363 B1 | 2/2003 | Sullivan | |
| 6,533,225 B1 | 3/2003 | Berges et al. | |
| 6,573,446 B1 | 6/2003 | Umstead et al. | |
| 6,737,576 B1 * | 5/2004 | Dinh | H02G 3/088 |
| | | | 174/480 |
| 6,818,823 B2 | 11/2004 | Barnes | |
| 6,837,726 B1 * | 1/2005 | Kiermaier | H01R 33/0836 |
| | | | 174/50 |
| 6,940,016 B1 * | 9/2005 | Cornett | H02G 3/126 |
| | | | 174/50 |
| 6,956,168 B2 | 10/2005 | Herth | |
| 7,075,004 B1 | 7/2006 | Gretz | |
| 7,129,411 B2 | 10/2006 | Bump et al. | |
| 7,394,019 B2 | 7/2008 | Gesue | |
| 7,816,604 B1 | 10/2010 | Gretz | |
| 7,842,884 B2 | 11/2010 | Johnson | |
| 8,076,575 B1 | 12/2011 | Gretz | |
| 8,242,360 B2 | 8/2012 | Bercy, Sr. | |
| 8,344,249 B1 | 1/2013 | Baldwin et al. | |
| 8,389,855 B2 * | 3/2013 | Plankell | H02G 3/086 |
| | | | 174/50 |
| 8,720,156 B2 | 5/2014 | Porter | |
| 9,392,711 B2 * | 7/2016 | Potucek | H02G 3/081 |

OTHER PUBLICATIONS

"U.S. Appl. No. 14/825,708: Response to Non-Final Office Action filed Dec. 22, 2016".

* cited by examiner

DOOR CHIME ASSEMBLY

CLAIM OF PRIORITY

This application is a continuation of U.S. application Ser. No. 14/825,708, filed Aug. 13, 2015, which claims the benefit of priority, under 35 U.S.C. Section 119(e), to Kenneth John Jonas, et al. U.S. Patent Application Ser. No. 62/037,985, entitled "DOOR CHIME ASSEMBLY," filed on Aug. 15, 2014, each of which is hereby incorporated by reference herein in its entirety.

BACKGROUND

Door chimes typically include a chime, a transformer and at least one switch. The switch is operably connected to the chime through a wired or wireless connection such that the switch can be actuated remotely from the chime to operate the chime and produce a chime sound. The switch is commonly mounted at an exterior location proximate to a door, while the chime is mounted within an interior space such that occupants within the building can hear the chime sound. The chime is connected to a power source, for example, utility power servicing a house via a transformer, which lowers the voltage of the house power to an appropriate voltage for the chime. The transformer is frequently installed proximate to a junction box for the building, which is typically mounted away from the interior spaces most frequently occupied by occupants. As such, the wiring between the transformer and the chime can be routed a considerable distance.

Accordingly, certain door chime assemblies position the transformer proximate to the chime to avoid challenges, time, and expense in routing the wiring, which can be particularly cumbersome in existing construction. While the close proximity of the transformer and chime reduces the requirement of extending wiring between the transformer and chime, the close proximity presents different challenges including: safely positioning the transformer and chime in close proximity, mounting the transformer and chime within the same or proximate wall or supporting structure and wiring the switch to the chime around the added bulk of the transformer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

Examples according to this disclosure are directed to, inter alia, challenges associated with proximately mounting a transformer and a door chime to avoid having to wire the chime to the transformer from a remote location. In an example, the present subject matter includes a door chime assembly including an electrical box mountable to a frame of a wall (e.g., a joist or stud), or the construction sheeting covering the wall frame (e.g., drywall, which is sometimes referred to as gypsum board). The door chime assembly can also include a transformer releasably coupled to a bracket. The transformer can be inserted into the electrical box through an opening in the box such that the bracket at least partially covers the opening to isolate the transformer within the electrical box and such that a low voltage portion and a high voltage portion of the transformer are disposed behind the bracket within the electrical box. The chime can be mounted proximate the bracket opposite the transformer.

In an example, the transformer can include at least one high voltage input wire connected to the high voltage portion of the transformer behind the bracket and inserted through an inlet port in the box wall of the electrical box. The transformer can also include at least one low voltage output wire connected to the low voltage portion of the transformer behind the bracket and extending through a port in the bracket such that the chime can be wired to the transformer while isolated from the high voltage input wires by the bracket. The bracket can include at least one cover positioned over the port for the low voltage output wires to deflect the output wires exiting through the port in the bracket. The bracket can also include at least one clip for retaining a portion of the low voltage output wires against the bracket. The covers and clips can cooperate to position the ends of the output wires for coupling with the chime without slack portions.

Figure 1:
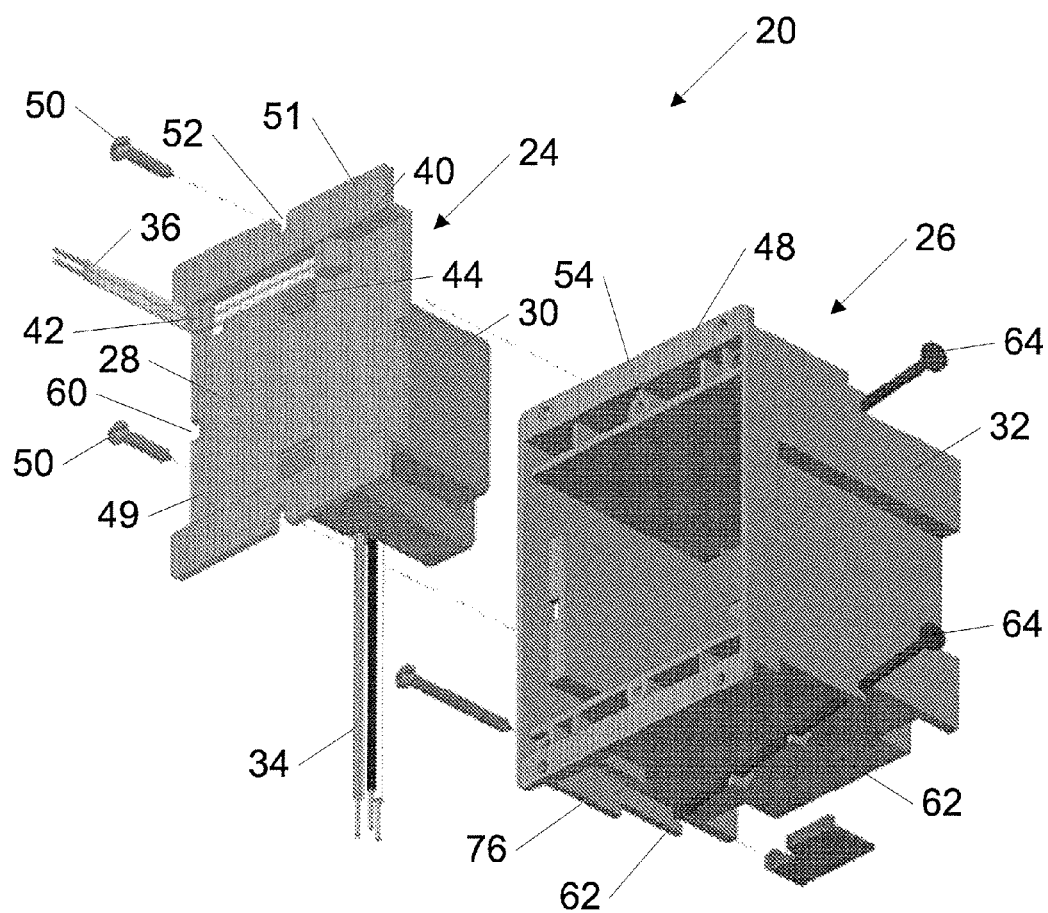
FIG. 1 is an exploded front perspective view of a door chime assembly according to an example of the present disclosure.
Figure 2:
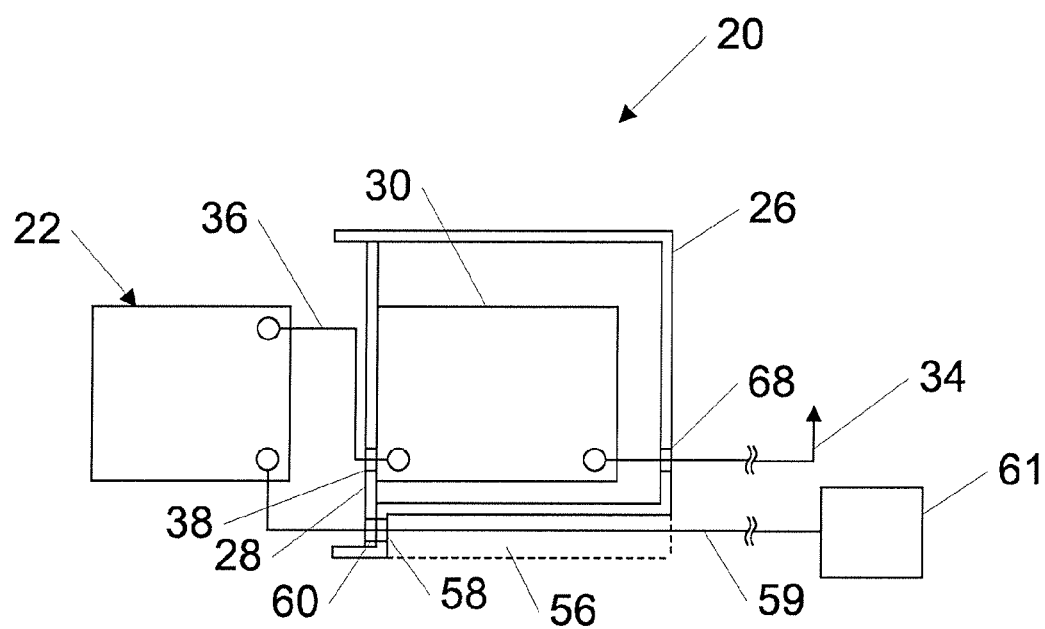
FIG. 2 is a schematic diagram of a door chime assembly according to an example of the present invention.
Figure 3:
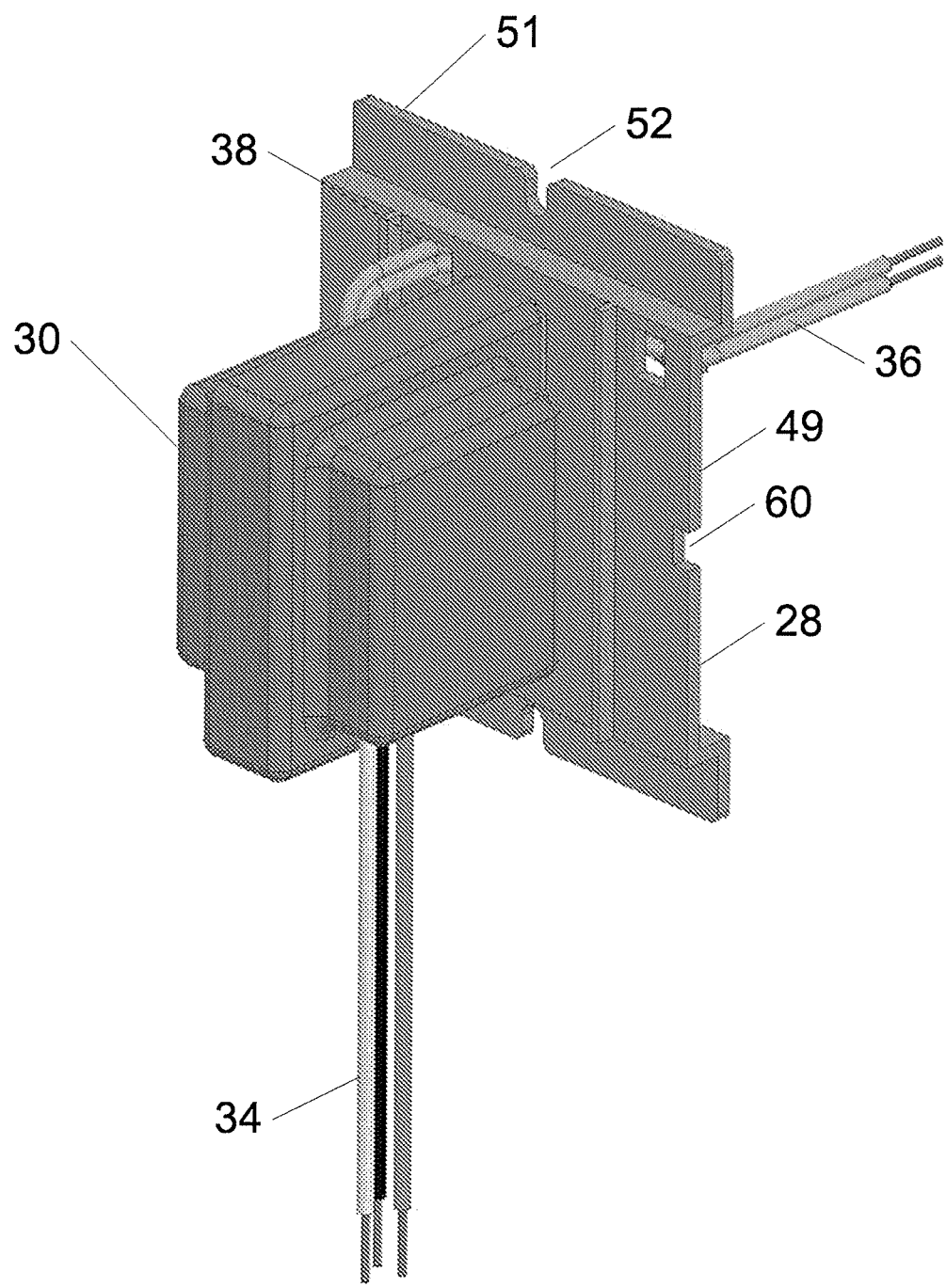
FIG. 3 is a rear perspective view of a transformer assembly according to an example of the present disclosure.

As depicted in FIGS. 1-2, a door chime assembly 20, according to an example, can include a chime 22, a transformer assembly 24 and an electrical box 26. The transformer assembly 24 can further include a bracket 28 and a transformer 30 releasably coupled to the bracket 28. As illustrated in FIG. 3, the transformer 30 includes a low voltage portion 30*a* and a high voltage portion 30*b*. When the transformer 30 is coupled to the bracket 28, the low and high voltage portions 30*a*, 30*b*, respectively, of the transformer 30 are disposed behind the bracket. The electrical box 26 can be mounted within a wall and can include a box wall 32 defining an interior space having at least one opening in the box wall 32. As depicted in FIG. 1, in an example, the transformer 30 can be inserted into the interior space of the electrical box 26 through the opening such that the bracket 28 is positioned over or adjacent the opening. The chime 22 can be mounted proximate the bracket 28 opposite the transformer 30 such that the bracket 28 substantially separates and isolates the transformer 30 within the electrical box 28. The bracket 28 and the box wall 32 cooperate to isolate the transformer 30 from the chime 22 and the surrounding wall structure.

As depicted n FIGS. 1-6, in an example, the transformer assembly 24 can include the bracket 28 and the transformer 30. The transformer 30 can further include at least one high voltage input wire 34 that can be connected to the high voltage portion 30*b* of the transformer 30 and wired to the house power and at least one low voltage output wire 36 that can be connected to the low voltage portion 30*a* of the transformer 30 and wired to the chime 22. The bracket 28 can define at least one outlet port 38 through which an end of each low voltage wire 36 can be inserted through the bracket 28 such that the bracket 28 isolates the inserted ends of the low voltage wires 36 from the transformer 30 and the high voltage input wires 34.

As depicted in FIGS. 1 and 3-6, in certain examples, the bracket 28 can include at least one port cover 40 for deflecting at least one output wire 36 exiting through the outlet port 38. In certain examples, the bracket 28 can include at least one clip 42 for retaining at least one output wire 36 against the bracket 28. The bracket 28 can have various combinations of covers 40 and clips 42, including no covers 40 and/or clips 42, cooperating to position the inserted ends of the output wires 36 proximate to the input connectors of the chime 22. The covers 40 and clips 42 can also cooperate to retain the output wires 36 to avoid slack in the output wires 36 that can become snagged during installation.

Figure 4:
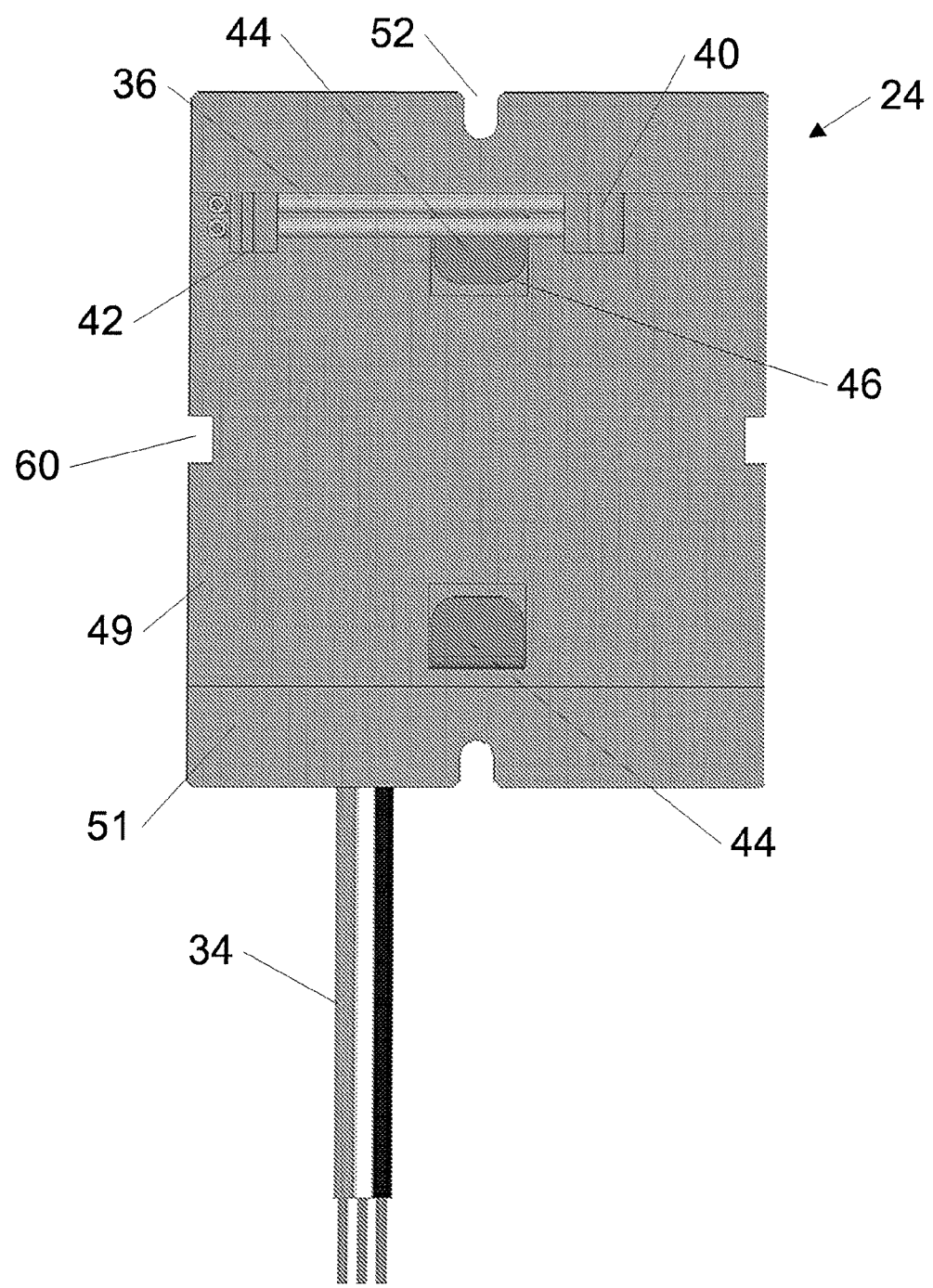
FIG. 4 is a front view of the transformer assembly depicted in FIG. 3.
Figure 5:
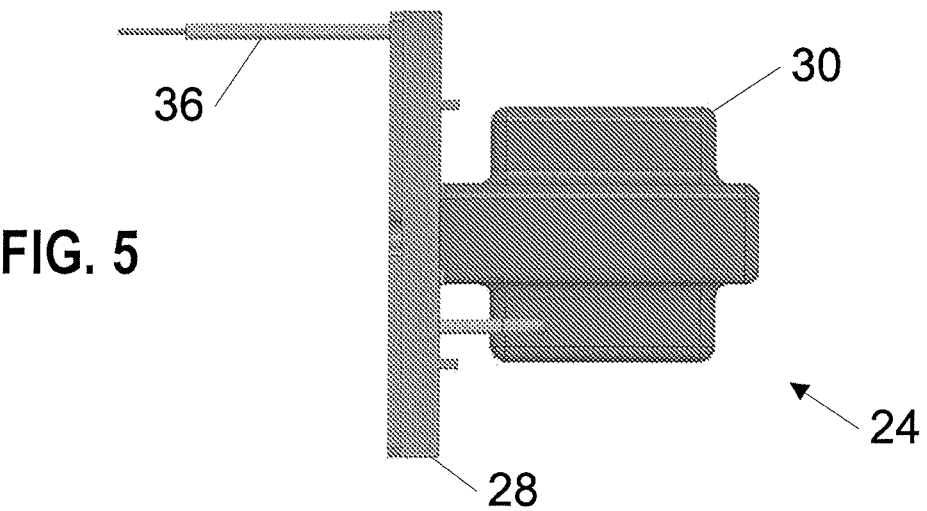
FIG. 5 is a top view of the transformer assembly depicted in FIG. 3.

As depicted in FIGS. 1 and 4, in an example, the transformer 30 can further include at least one mounting element 44. In this configuration, the bracket 28 can further include at least one transformer mount 46 corresponding to at least one of the mounting elements 34. Each mounting element 44 can be releasably coupled to a corresponding transformer mount 46 to secure the transformer 30 to the bracket 28. In certain examples, the transformer assembly 24 can include at least two pairs of mounting elements 44 and transformer mounts 46 that cooperate to engage the transformer 30 to the bracket 28 and prevent rotation of the transformer 30 relative to the bracket 28. In certain examples, the mounting element 44 can include a clip releasably connected to the transformer 30 and the transformer mount 46 can include a planar element, for example, a pocket in a face of the bracket 28 sized to be engaged by the releasable clip as depicted in FIG. 4.

As depicted in FIGS. 1-2 and 7-10, in an example, electrical box 26 can include a box wall 32 defining an interior space having at least one opening. In certain examples, the electrical box 26 can include an flange feature 48 proximate the opening and extending approximately perpendicular to the box wall 32. In the examples depicted, the flange feature 48 extends from the two discrete portions of the box wall 32, for example, the top and bottom of the box wall 32. However, in other examples, the electrical box could include a flange on different portions of the box wall, for example, the left and right sides, or a flange that extends around the periphery of the box wall. The flange feature 48 can be configured to seat the electrical box 26 on a wall of a house when the box is mounted within a hole in the wall, for example, within a hole in drywall.

Figure 6:
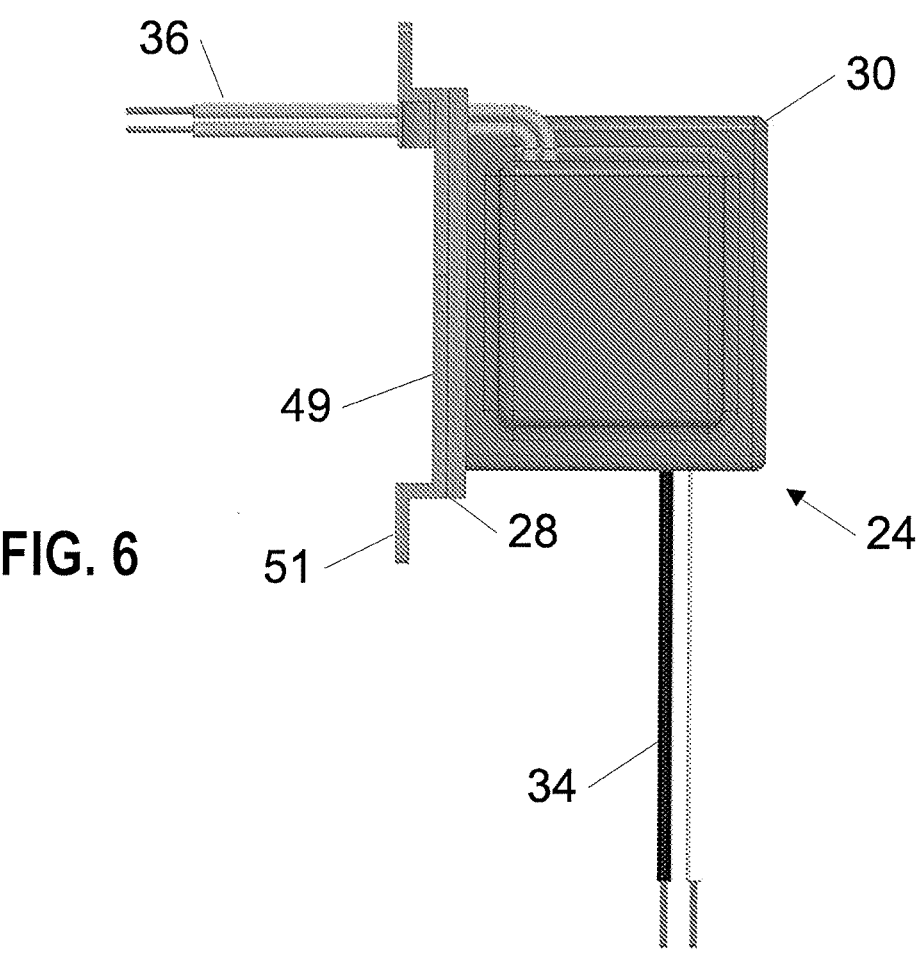
FIG. 6 is a side view of the transformer assembly depicted in FIG. 3.
Figure 7:
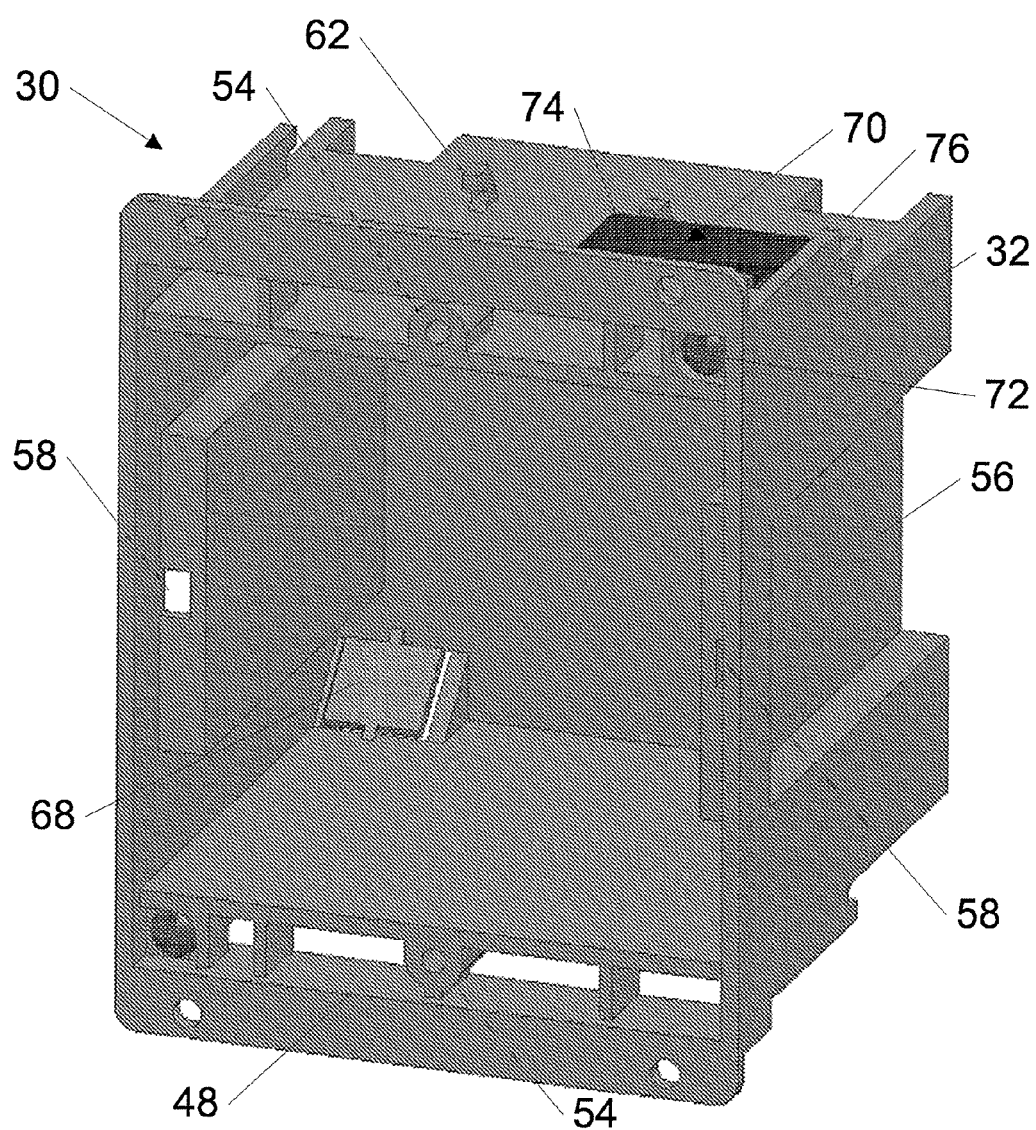
FIG. 7 is a front perspective view of an electrical box according to an example of the present disclosure.
Figure 8:
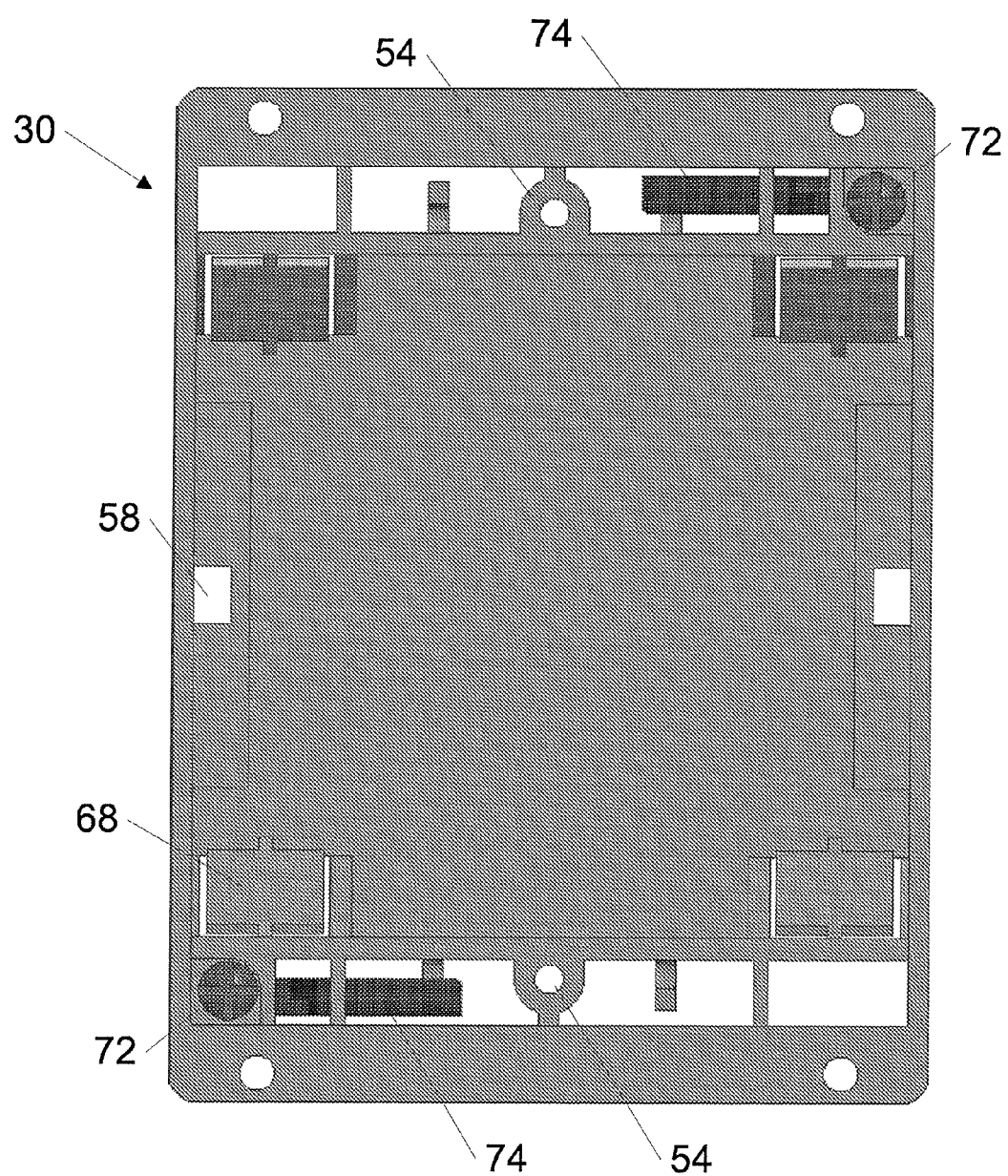
FIG. 8 is a front view of the electrical box depicted in FIG. 7.

In the illustrated example, the transformer 30 is inserted through the opening of the electrical box 26 such that the bracket 28 is positioned over or adjacent the opening. In one example, a portion of the bracket 28 engages the inner flange feature 48. In another example, the bracket 28 may seat within the opening such that the outward facing side of the bracket 28 lies substantially flush with the flange feature 48. As depicted in FIGS. 1, 3 and 6, the bracket 28 can include a recessed portion 49 and a flanged portion 51 engagable to the inner flange feature 48. The recessed portion 49 can receive a portion of the chime 22 to reduce protrusion of the chime 22 out from the wall. In an example, at least one fastener 50 is inserted through the bracket 28 and a portion of the electrical box to secure the bracket 28 to the electrical box 26. As depicted in FIG. 1, in certain examples, the bracket 28 can define a notch 52 or bore hole for receiving the fastener 50. In this configuration, the electrical box 26 can include a bore hole 54 corresponding to the notch 52, wherein the fastener 50 can be inserted through the notch 52 and into the bore hole 54 to secure the bracket 28 to the box 26.

As depicted in FIG. 2, in an example, the bracket 28 can be sized to approximate the size of the opening of the electrical box 26. In this configuration, the bracket 28 and the box wall 32 cooperate the isolate the transformer 30 within the interior space of the box wall 32. The box wall 32 can include an inlet port 68 through which the high voltage input wires 34 can be inserted to reach the transformer 30.

As depicted in FIGS. 1-2 and 7-10, in an example, the box wall 32 can define at least one wiring channel 56 on an exterior portion of the box wall 32 and a corresponding chime port 58 positioned at an end of the wiring channel 56. The chime port 58 can be positioned proximate to the opening of the electrical box 26 such that wiring 59 for the chime 22 from a remotely positioned switch 61 can be threaded through the wiring channel 56 and the chime port 58 to exit through the opening of the electrical box 26. In an example, the bracket 28 can include at least one notch 60 or opening corresponding to the chime port 58. The notch 60 aligns with the chime port 58 when the bracket 28 is positioned within the opening of the electrical box 26 such that the switch wiring 59 can be threaded through the bracket 28 upon exiting the chime port 58. In this configuration, the switch wiring 59 for the chime 22 is also isolated from the transformer 30 and the high voltage input wires 34.

Figure 9:
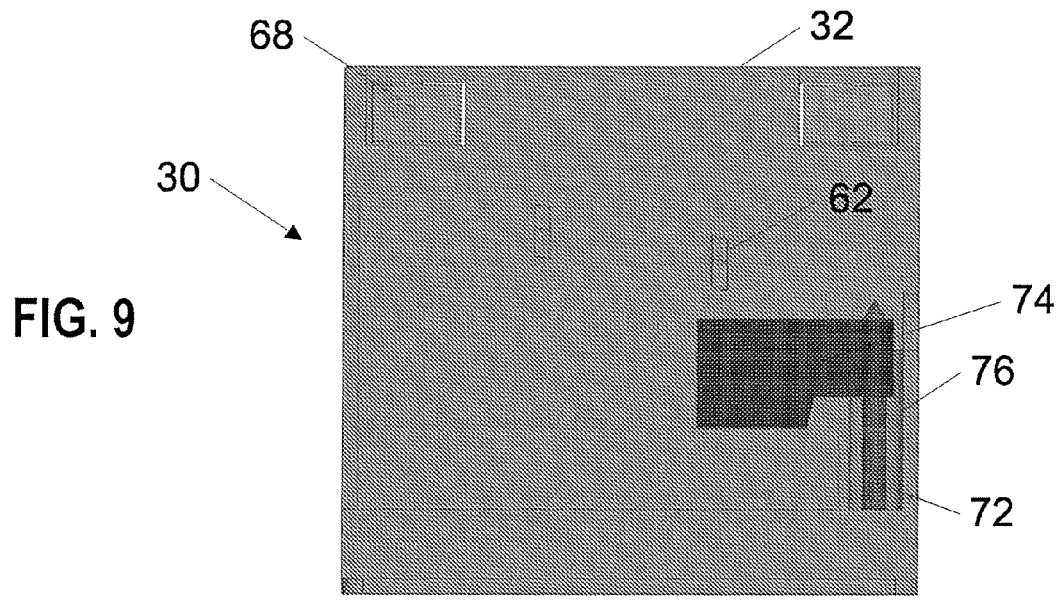
FIG. 9 is a top view of the electrical box depicted in FIG. 7.
Figure 10:
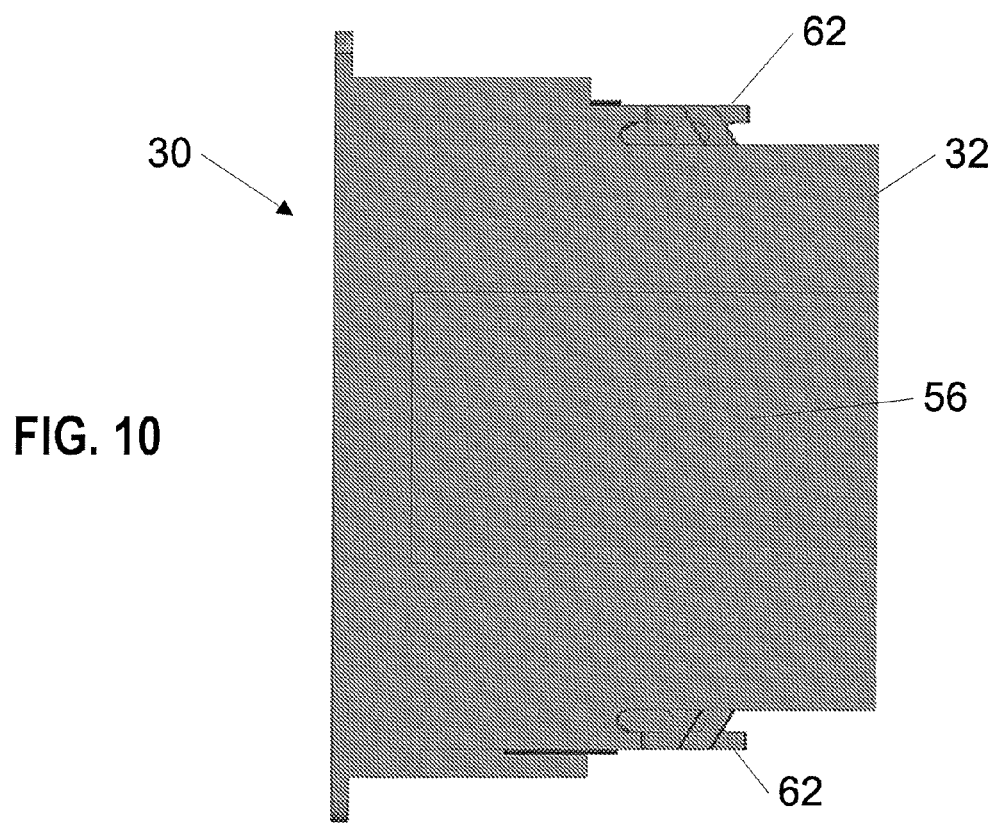
FIG. 10 is a side view of the electrical box depicted in FIG. 7.
Figure 11:
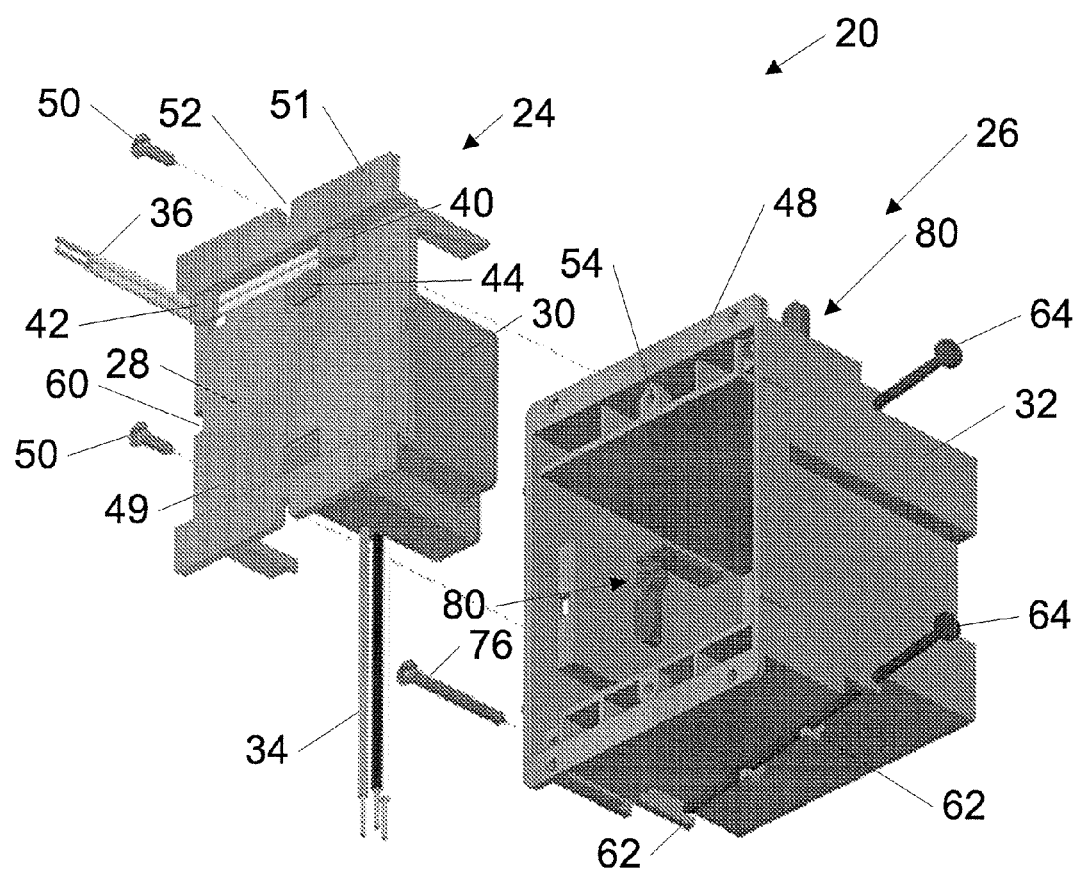
FIG. 11 is an exploded front perspective view of a door chime assembly according to an example of the present disclosure.

As depicted in FIGS. 1 and 9, in an example, the electrical box 26 can include at least one fastener feature 62 for receiving at least one stud fastener 64. In some cases, the stud fastener 64 is packaged and/or purchased separately from chime assembly 20 and electrical box 26. For example, the stud fastener 64 can be of a variety of standard construction nails and fastener feature 62 can be configured to receive such nails at the time of installation of chime assembly 20. In certain examples, the electrical box 26 can include a plurality of fastener features 66 aligned linearly to guide the stud fastener 64 along a linear insertion axis. The linear insertion axis can be oriented to mount the electrical box 26 to a frame or stud. The stud fastener 64 can comprise a screw, a nail or a partially threaded nail. In an example, the electrical box 26 can be mounted such that the opening is positioned adjacent the frame or stud.

As depicted in FIGS. 1 and 7-9, in an example, the electrical box 26 can include at least one drywall engagement assembly 70. Each engagement assembly 70 includes a stem 72 and a retention tab 74. Each retention tab 74 is rotatable by rotating stem 72 between a retracted position in which the tab 74 is flush with the outside of box wall 32 and a deployed position in which the tab 74 extends transversely from the box wall 32. In operation, the electrical box 26 can be inserted through an opening in an existing wall with the retention tabs 74 positioned in the retracted position. After the electrical box 26 is positioned within the wall, the tabs 74 are rotated into the deployed position by turning the stem 72 to retain the electrical box 26 within the wall.

Stem 72 can, in some examples, be a threaded fastener like a screw, which can threadably engage tab 74. The position of the tab 74 relative to flange feature 48 of electrical box 26 can be set by the length of stem 72 and the amount stem 72 is threadably engaged with tab 74 (e.g. axial length of stem 72 within bore in tab 74). In one example, the offset between the tab 74 and the flange feature 48 is set to accommodate a number of thicknesses of drywall in existing construction homes or other buildings. For example, the offset between the tab 74 and the flange feature 48 may be set to in a range from approximately 0.75 inches to approximately 1.5 inches. In one example, the offset between the tab 74 and the flange feature 48 is in a range from approximately 0.5 to approximately 1 inch.

In an example, the box wall 32 can include a stop 76 corresponding to each retention tab 74. The stop 76 engages the corresponding tab 74 when the tab 74 is rotated into the deployed position to prevent rotation of the tab 74 past the deployed position. In certain examples, the stem 72 is threaded such that continued rotation of the stem 72 when the retention tab 74 is rotated into the deployed position and into engagement with the stop 76 causes the tab 74 to move axially relative to the stem 72. The retention tab 74 can be moved axially into engagement with the inside of the existing wall to retain the electrical box 30 within the existing wall.

As depicted in FIGS. 11-19, in an example, the door chime assembly 20 can further include an alternative drywall engagement assembly 80 for installation of the door chime assembly 20. In the examples of FIGS. 11-19, retention tabs 84 are decoupled from the electrical box 26 before positioning the box in a hole in the wall and are coupled to the box 26 in a deployed position after the box is positioned in the hole in the wall. The engagement assembly 80 includes a threaded stem 82 and a deployable tab 84 having a threaded element 86 and a wall engagement portion 88. The threaded element 86 defines a threaded bore hole for receiving the threaded stem 82 such that wall engagement portion 88 extends radially from the threaded stem 82. In operation, rotation of the threaded stem 82 can operate to move the deployable tab 84 axially along the threaded stem 82. When the electrical box 26 is positioned within a roughed out hole in a wall, the threaded stem 82 can be rotated to move deployable tab 84 axially until a portion of the wall is secured between the deployable tab 84 and the flange feature 48 of the electrical box 26.

As depicted in FIGS. 12-19, in an example, the engagement assembly 80 can further include a guide element 90. In this configuration, the electrical box 26 can define at least one slot 92 for receiving a corresponding guide element 90 to maintain the deployable tab 84 along a predetermined radial axis as the threaded stem 82 is rotated to move the deployable tab 84 axially. For example, the slot 92 can receive guide element 90 to maintain the deployable tab 84 in a deployed position approximately perpendicular to box wall 32 and the threaded stem 82 can be rotated to move the deployable tab 84 axially. Slot 92 in box wall 32 of electrical box 26 terminates at a prescribed distance away from, for example, the opening in the box 26. As such, slot 92 may also function to stop deployable tab 84 from being pushed back when threaded stem 82 is initially threaded into threaded element 86 after deployable tab 84 has been inserted through box wall 32 of the electrical box 26 positioned in a hole in a wall.

Figure 12:
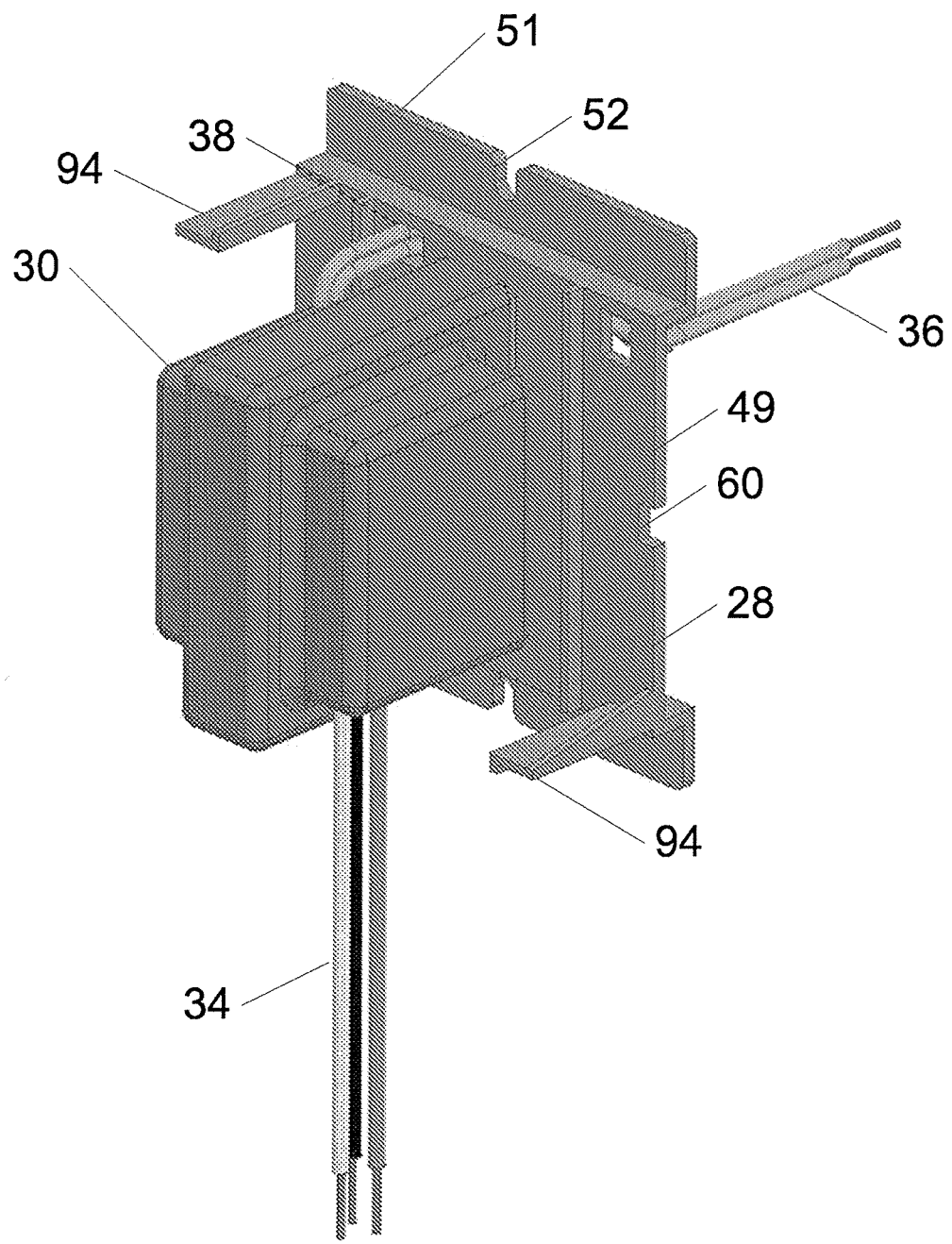
FIG. 12 is a rear perspective view of a transformer assembly according to an example of the present disclosure.
Figure 13:
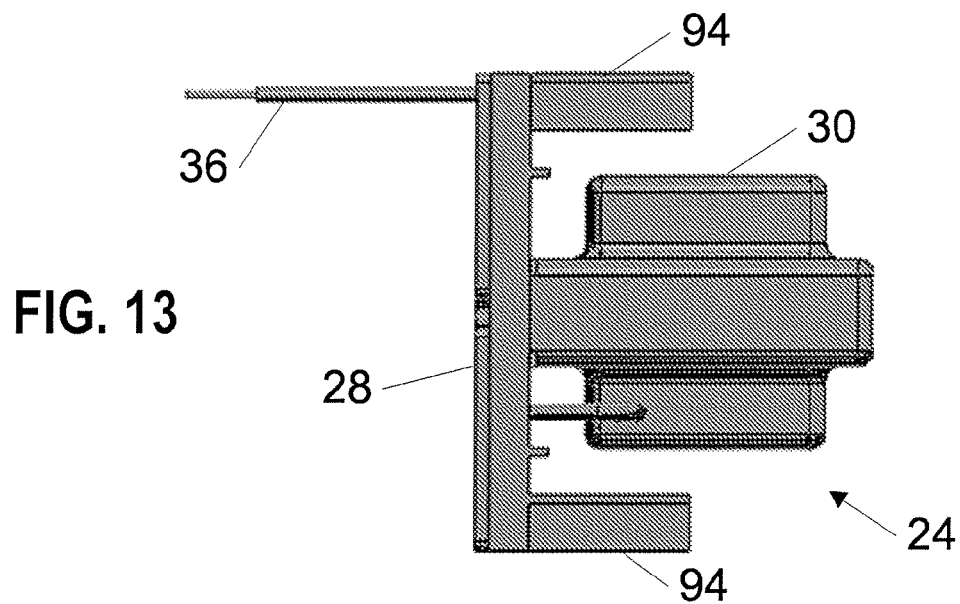
FIG. 13 is a top view of the transformer assembly depicted in FIG. 12.
Figure 14:
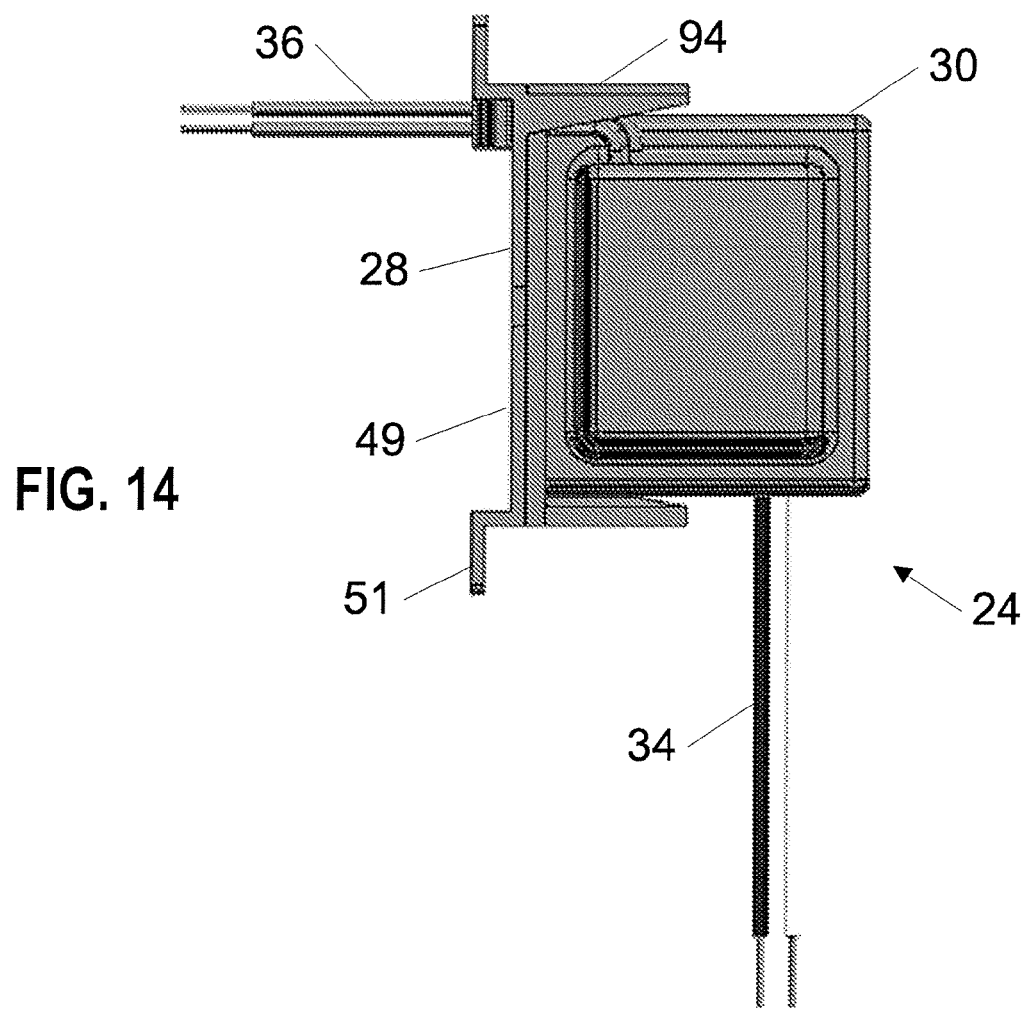
FIG. 14 is a side view of the transformer assembly depicted in FIG. 12.
Figure 15:
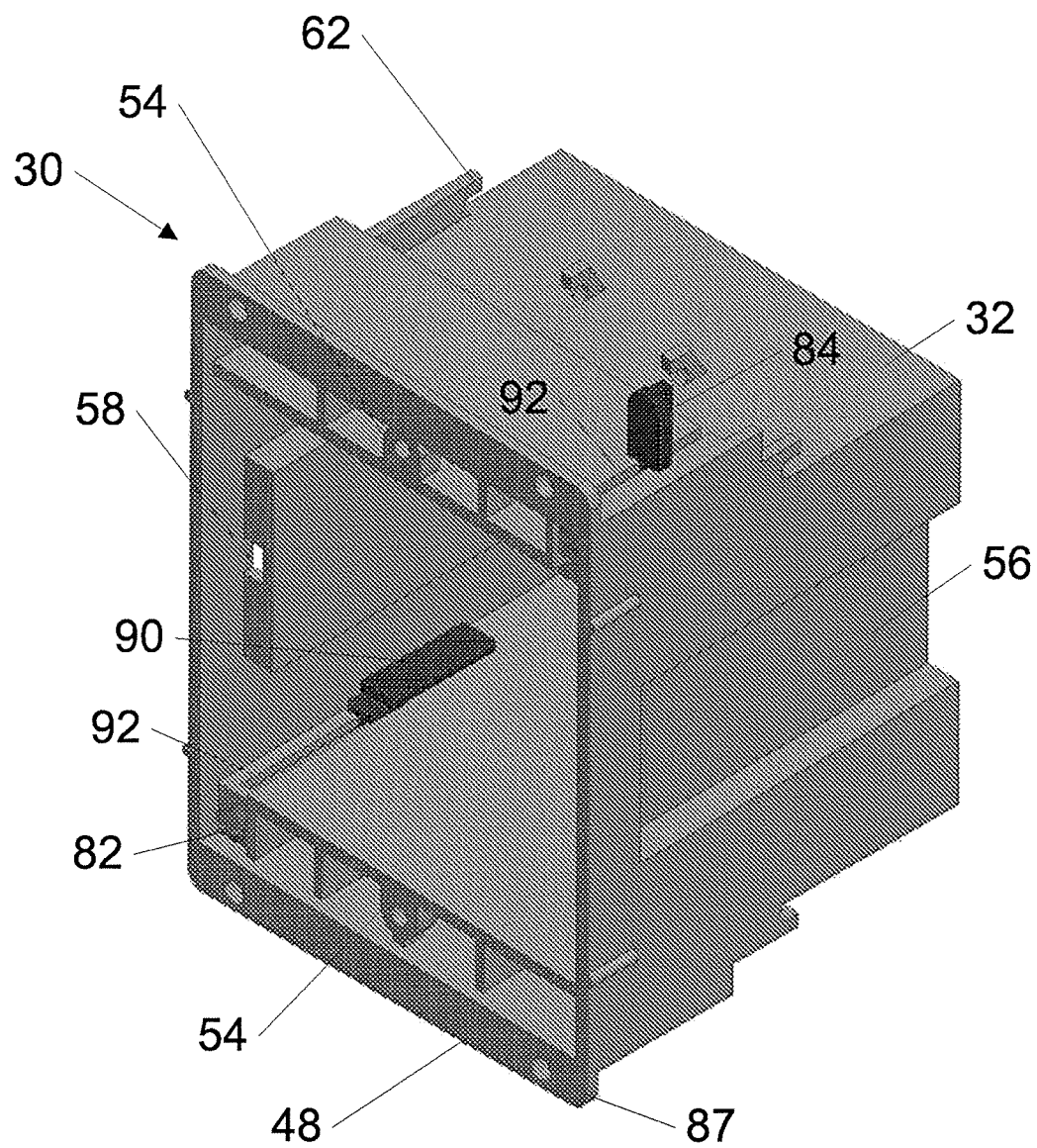
FIG. 15 is a front perspective view of an electrical box according to an example of the present disclosure.
Figure 16:
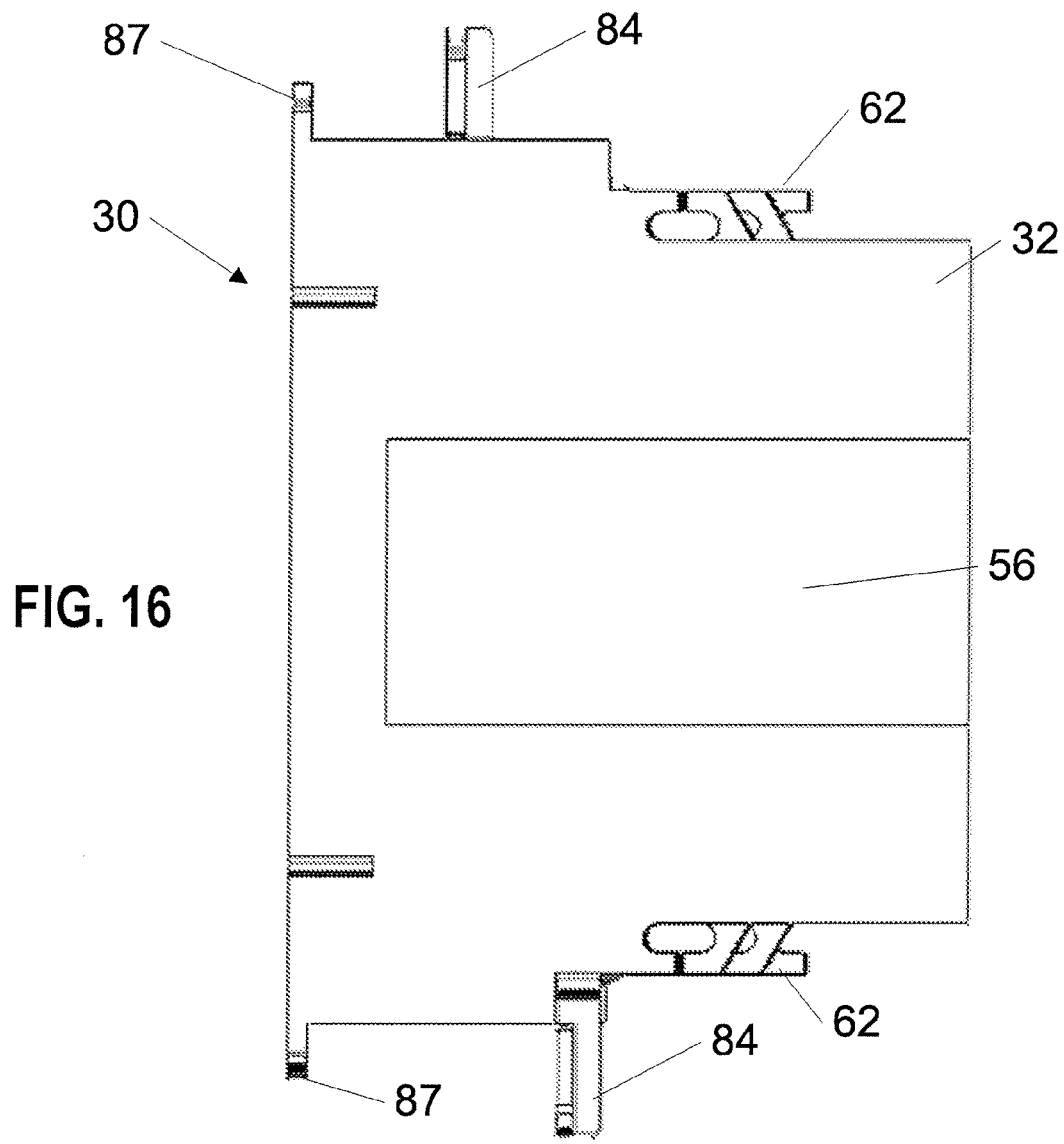
FIG. 16 is a front view of the electrical box depicted in FIG. 15.
Figure 17:
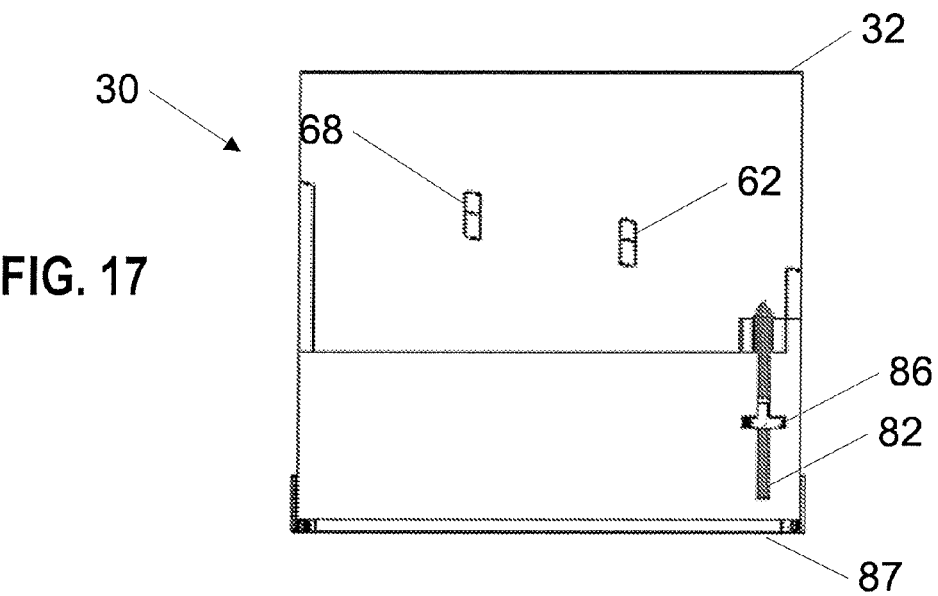
FIG. 17 is a top view of the electrical box depicted in FIG. 15.
Figure 18:
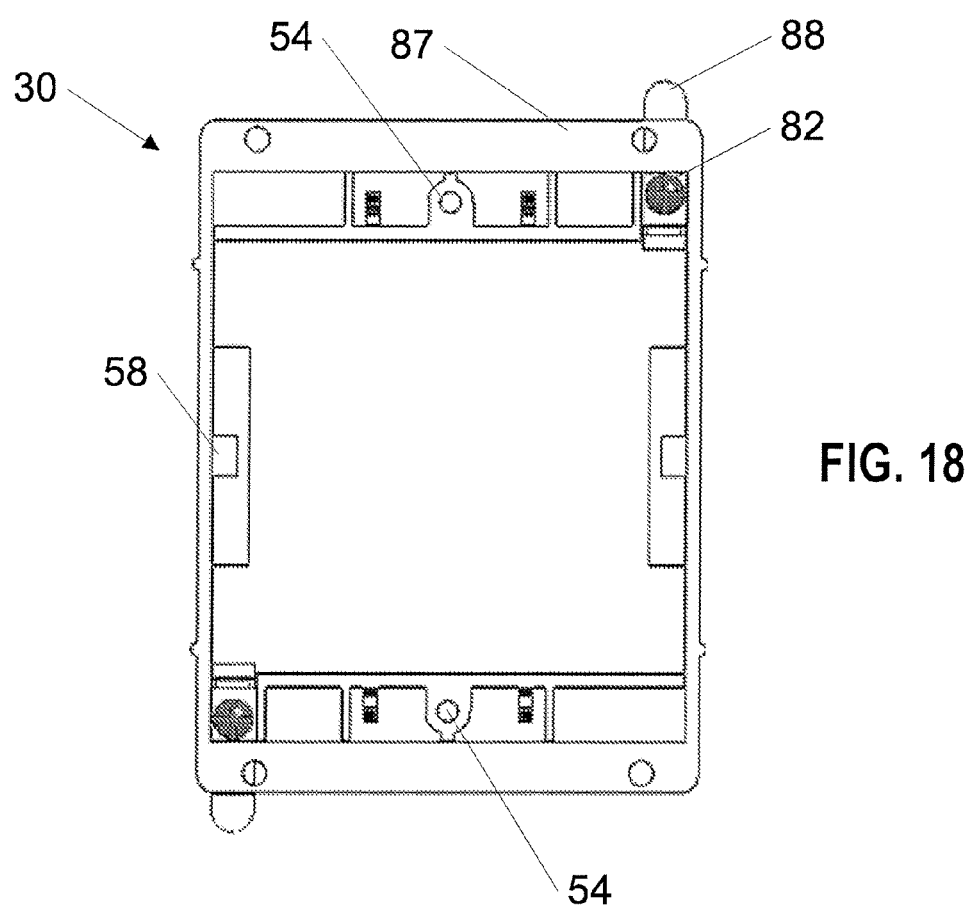
FIG. 18 is a side view of the electrical box depicted in FIG. 15.
Figure 19:
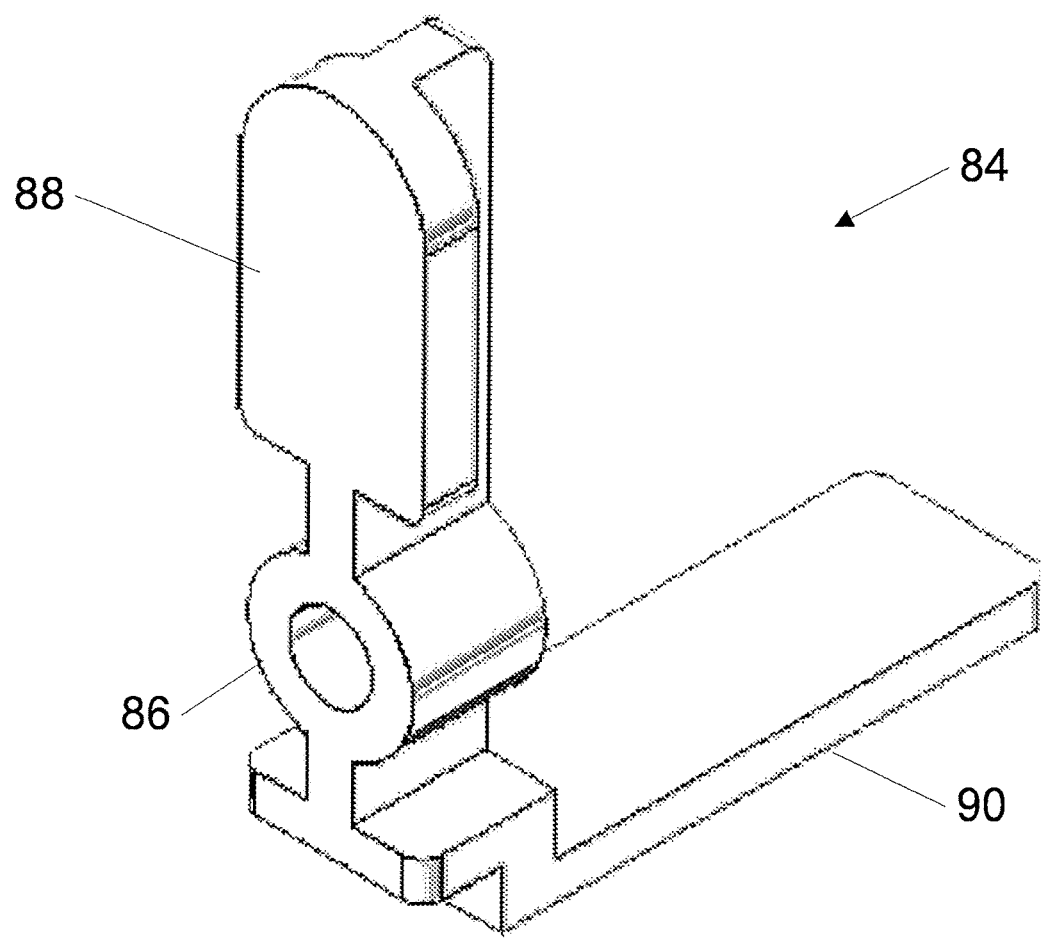
FIG. 19 is a perspective view of a deployable tab according to an example of the present disclosure.

In some situations, for example, in new construction in which fastener features 62 and stud fasteners 64 will be employed to mount electrical box 26 to a stud, deployable tabs 84 may not be used and thus may even be discarded prior to installation. As depicted in FIGS. 12-14, in such situations in which deployable tabs 84 are not employed, bracket 28 can include protrusions 94 positioned and shaped to cover the holes/slots in the box wall 32 of the electrical box 26 through which deployable tabs 84 are configured to be inserted.

ADDITIONAL NOTES & EXAMPLES

Example 1 is a door chime assembly comprising: an electrical box comprising a wall defining an interior space and an opening; and a transformer assembly coupled to the electrical box, the transformer assembly comprising: a bracket coupled to the electrical box; and a transformer releasably coupled to the bracket, the bracket at least partially covering the opening of the electrical box to isolate the transformer in the interior space of the electrical box.

In Example 2, the door chime assembly of Example 1, wherein the transformer comprises a low voltage portion and a high voltage portion disposed behind the bracket in the interior space of the electrical box.

In Example 3, the door chime assembly of Example 1 or 2, wherein the electrical box comprises an attachment element for attaching the electrical box to a frame element in a wall of a building.

In Example 4, the door chime assembly of any one of Examples 1-3, wherein the electrical box comprises an attachment element for attaching the electrical box to construction sheeting of a wall of a building.

In Example 5, the door chime assembly of Example 1 or 2, wherein the electrical box comprises: an attachment element for attaching the electrical box to a frame element in a wall of a building; and an attachment element for attaching the electrical box to construction sheeting of a wall of a building.

In Example 6, the door chime assembly of Example 1 or 2, wherein the electrical box comprises an attachment element for receiving a fastener for attaching the electrical box to a frame element in a wall of a building.

In Example 7, the door chime assembly of Example 1 or 2, wherein the electrical box comprises: an attachment element for receiving a fastener for attaching the electrical box to a frame element in a wall of a building; and an attachment element for attaching the electrical box to construction sheeting of a wall of a building.

In Example 8, the door chime assembly of any one of Examples 1-7, further comprising a door chime coupled to the bracket, the transformer being coupled to a first side of the bracket and the door chime being coupled to a second side of the bracket opposite the first side.

In Example 9, the door chime assembly of Example 8, further comprising a switch electrically connected to the door chime via at least one low voltage wire.

In Example 10, the door chime assembly of any one of Examples 1-9, further comprising at least one low voltage input wire and at least one high voltage input wire coupled to the transformer, the at least one low voltage input wire extending from the transformer through an aperture in the bracket.

In Example 11, the door chime assembly of Example 10, the bracket comprising a cover aligned with one side of the aperture and configured to deflect the at least one low voltage input wire extending through the aperture.

In Example 12, the door chime assembly of Example 11, the bracket comprising at least one clip retaining a portion of the at least one low voltage input wire extending through the aperture.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A door chime assembly comprising:
   an electrical box comprising a wall defining an interior space and an opening; and
   a transformer assembly configured to be coupled to the electrical box, the transformer assembly comprising:
      a bracket configured to be coupled to the electrical box; and
      a chime mounted to a first side of the bracket;
      a transformer coupled to a second side of the bracket opposite the first side of the bracket,
      wherein the bracket is configured to at least partially cover the opening of the electrical box to isolate the transformer from the chime.

2. The door chime assembly of claim 1, the transformer comprising a low voltage portion and a high voltage portion disposed behind the bracket in the interior space of the electrical box.

3. The door chime assembly of claim 1, the electrical box comprising an attachment element for attaching the electrical box to a frame element in a wall of a building.

4. The door chime assembly of claim 1, the electrical box comprising an attachment element for attaching the electrical box to construction sheeting of a wall of a building.

5. The door chime assembly of claim 1, the electrical box comprising:
   a first attachment element for attaching the electrical box to a frame element in a wall of a building; and
   a second attachment element for attaching the electrical box to construction sheeting of a wall of a building.

6. The door chime assembly of claim 5, the electrical box comprising a third attachment element for receiving a fastener for attaching the electrical box to a frame element in a wall of a building.

7. The door chime assembly of claim 1, the electrical box comprising:
   a third attachment element for receiving a fastener for attaching the electrical box to a frame element in a wall of a building; and
   a second attachment element for attaching the electrical box to construction sheeting of a wall of a building.

8. The door chime assembly of claim 1, further comprising a switch electrically connected to the door chime via at least one low voltage wire.

9. The door chime assembly of claim 1, further comprising at least one low voltage input wire and at least one high voltage input wire coupled to the transformer, the at least one low voltage input wire extending from the transformer through an aperture in the bracket.

10. The door chime assembly of claim 9, the bracket comprising a cover aligned with one side of the aperture and configured to deflect the at least one low voltage input wire extending through the aperture.

11. The door chime assembly of claim 10, the bracket comprising at least one clip retaining a portion of the at least one low voltage input wire extending through the aperture.

\* \* \* \* \*